F. FUREDY

Dec. 20, 1932. SELF INKING FOUNTAIN PEN Re. 18,702

Original Filed April 14, 1932

INVENTOR
Frank Furedy
BY
Harry Bowen
ATTORNEY

Reissued Dec. 20, 1932

Re. 18,702

UNITED STATES PATENT OFFICE

FRANK FUREDY, OF NEW YORK, N. Y., ASSIGNOR TO INKPAK MANUFACTURING CO. INC., A CORPORATION OF NEW YORK

SELF-INKING FOUNTAIN PEN

Original No. 1,880,128, dated September 27, 1932, Serial No. 605,229, filed April 14, 1932. Application for reissue filed October 13, 1932. Serial No. 637,663.

The invention is a fountain pen that manufactures its own ink as it is used from dye cartridges inserted in a chamber in the feeder member below the nib, by water contained in the sack which feeds thru the dye cartridge as the pen is used.

An object of the invention is to provide a fountain pen that manufactures its own ink from dye cartridges.

Another object of the invention is to provide a fountain pen that manufactures its own ink from dye cartridges so that water only is required to refill the pen except at such times as the dye cartridges are used up.

Another object of the invention is to provide a fountain pen which manufactures its own ink in which the ink sack of a fountain pen is used as the water reservoir by which the ink is manufactured.

A further object of the invention is to provide a fountain pen having a liquid reservoir.

A still further object of the invention is to provide a dye cartridge for fountain pens that may be inserted in the feed and is adaptable to supply ink as water flows therethru.

And a still further object of the invention is to provide a fountain pen that manufactures its own ink which is of a comparatively simple and economical construction.

With these ends in view the invention embodies a fountain pen having a chamber in the feed below the nib in which dye cartridges may be contained.

Other features and advantages of the invention will appear from the following description taken in connection with the drawing, wherein.

Figure 2:
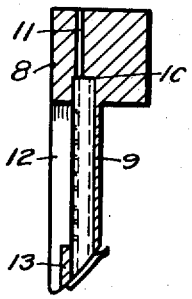
Figure 2 is a view showing a cross section thru the feed.
Figure 3:
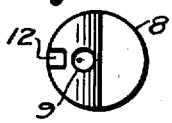
Figure 3 is a view showing an end view of the feed.

In the drawing the pen is shown as it would be made wherein numeral 1 indicates the body of the pen, numeral 2 the cap, and numeral 3 the dye cartridge storage chamber as may be used in the pen. The pen 1 may be of any type or design, may be arranged in any desired manner, and any make of pen may be used. In the design shown the casing, as indicated by numeral 1, is frictionally held to a base 4 to which a sack 5 is attached, as shown, and the lower end of the base is provided with an opening 6 into which a nib 7 and the feeder member 8 are inserted, as shown. It will be understood that a nib of any type or design may be used and also that the nib may be changed as often as may be desired. The feeder member 8 is made, as shown in Figure 2, with a cylindrical chamber 9 extending upward from the lower end to the point 10 and then from the end of the chamber 9 to the upper end of the feeder is a very small passage 11 connecting the chamber 9 to the water reservoir. In the upper part of the feed is a longitudinal slot 12 and the lower end is connected with a small bar 13, as shown.

Figure 4:
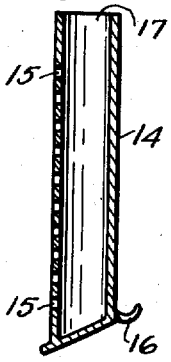
Figure 4 is a view showing one of the dye cartridges with part broken away.
Figure 5:
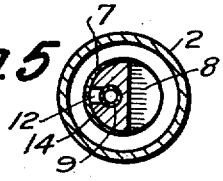
Figure 5 is a cross section thru the pen taken on the line 5—5 in Figure 1.

The dye cartridge 14, which is inserted in the opening 9, is made, as shown in Figure 4, with a thin cylindrical casing having openings 15 in the upper side which, when the dye cartridge is inserted in the opening 9, will correspond with the slot 12, and at one end of the dye cartridge is a projection 16 that may readily be caught by the finger nail or other object, to withdraw the dye cartridge from the chamber 9. The opposite end of the dye cartridge is open and the interior is filled with an ink dye, as indicated by the numeral 17, and as the device is used water will flow downward from the sack 5 and wash the ink from the upper end of the dye cartridge thru the openings 15 and as the pen is used continuously the water will continue to flow downward into the dye cartridge and all of the dye will be washed out. This action constitutes the manufacture of the ink so that the pen actually manufactures its own ink as it is used. The pen 1 is provided with the usual fountain pen refill clip, as indicated by the numeral 18, so that water in the sack 5 may be replenished as desired.

The cap 2 may be of any type or design and may be screwed upon threads 19 at the lower end of the casing 1 when the pen is in a closed position, and may also be frictionally held in the upper end of the pen when the pen is in use.

Figure 1:
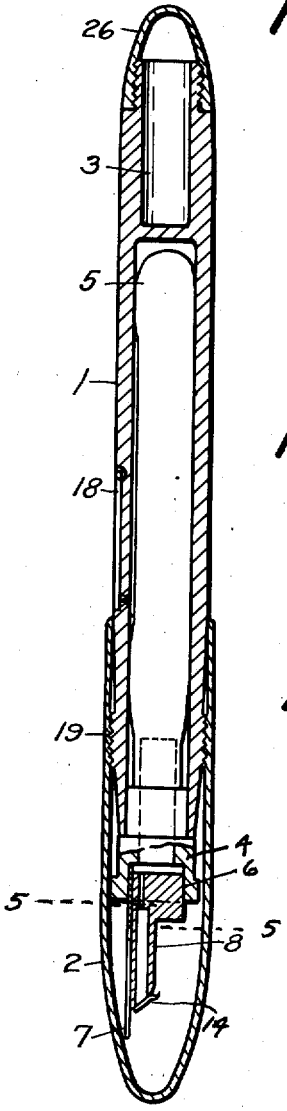
Figure 1 is a view showing a longitudinal section thru the pen.

The storage chamber 3 may be provided in the body of the pen, as shown in Figure 1, and a cap 26 may be screwed on the upper end to form a closure, as shown. It will be understood that the storage chamber 3 may be formed in any other manner and may be located at any other point in the pen.

It will be understood that other changes may be made in the construction without departing from the spirit of the invention. One of which changes may be in the use of the device in a pen of a different style, another may be in the use of other means for feeding water to the dye cartridges and still another may be in the use of a cap of a different design or type.

The construction will be readily understood from the foregoing description. In use the pen may be provided as shown and it is preferred to fill the water sack 5 by the clip 18 before the dye cartridge is inserted, however, the pen may be dipped in water and the sack refilled at any time, as may be desired. It will be noted that ordinarily there will be no action in the pen, however, as pressure is applied to the nib 7, the working action thereof will cause a small amount of water to feed thru the dye cartridges and this will supply ink to the point. The dye cartridges may readily be withdrawn and a new cartridge inserted from the chamber 3 as the ink is used. The device thereby provides a self inking fountain pen that manufactures its own ink as it is used.

Having now particularly described and ascertained the nature of my said invention and in what manner the same is to be performed, I declare that what I claim is:

1. An improved fountain pen comprising a barrel adapted to contain water, a feeder member mounted in said barrel and having a bore extending longitudinally therethrough communicating at its inner end with the interior of the barrel and at its outer end being exposed outwardly of the barrel, said feeder member having a slot in its side wall communicating with the bore and opening outwardly, a pen point associated with said feeder member and extending about the slot thereof, and a cartridge removably and frictionally inserted in the bore of said feeder member, said cartridge comprising an outer metallic case having an inner open end communicating with the water in the barrel and a closed outer end exposed through the outer open end of the barrel, said case having a perforated side wall communicating with the slot of the feeder member, an ink making material in said cartridge, and a hook upon the outer closed end of the cartridge case exposed for withdrawing the cartridge axially out of the feeder member.

2. An improved fountain pen comprising a barrel adapted to contain water, a feeder member fitted to said barrel and having a longitudinally extending bore communicating at its inner end with the water space in the barrel and being freely open at its outer end, said feeder member having a slotted side wall communicating with the bore, a pen point associated with the feeder member and fitted about said slotted side wall, and a cartridge member insertable in and removable from the outer open end of the bore with an outer closed end and an inner open end in communication with the water space of the barrel, said cartridge adapted to contain ink making material and having a perforated side wall in communication with the slotted wall of the feeder member.

3. In a fountain pen, a liquid-containing barrel, a feeder member, a pen nib, and a cartridge containing ink dye and consisting of a tubular shell having side openings, said cartridge so arranged that the liquid will flow into said side openings in said cartridge as it passes to the nib.

4. In a fountain pen, a water reservoir having an external opening through a passageway, means for holding ink consisting of a removable cartridge located in said passageway, said cartridge closed at one end and open at the opposite end and having a plurality of small openings in the wall thereof and having a projection at the closed end by which it may be withdrawn, said cartridge and projection also externally sealing said passageway.

5. An ink cartridge for a fountain pen comprising a metallic tubular casing open at one end and closed at the opposite end with a plurality of small openings in the wall thereof and a source of ink within said cartridge.

6. As an article of manufacture an ink cartridge comprising a cylindrical shell open at one end and closed at the opposite end having a plurality of openings in the side wall, a projection on the closed end and a source of ink within said cartridge.

7. As an article of manufacture an ink cartridge comprising a cylinder having a source of ink surrounded by a cylindrical shell and a plurality of openings in said shell.

Signed at New York, in the county of New York, State of New York, this 11th day of October, 1932.

FRANK FUREDY.